United States Patent Office 2,983,744
Patented May 9, 1961

2,983,744

HETEROCYCLES

Walter H. Knoth, Jr., Middletown, Del., assignor to E. I. du Pont de Nemours and Company, Wilmington, Del., a corporation of Delaware No Drawing. Filed Nov. 17, 1955, Ser. No. 547,543

11 Claims. (Cl. 260—448.2)

This invention relates to a new class of heterocyclic compounds and more particularly to a new class of heterocycles containing oxygen and silicon as heteroatoms.

This invention has as an object the preparation of intermediates for addition and condensation polymers. Other objects will appear hereinafter.

These objects are accomplished by the present invention of 2,2-dihydrocarbo-1-oxa-2-silacycloalkanes and hydrocarbo - substituted 2,2 - dihydrocarbo - 1 - oxa - 2 - silacycloalkanes of from five to seven ring members in the cyclic structure, one of which is the indicated oxygen atom in the 1-position and the other of which is the indicated silicon atom in the 2-position. The two hydrocarbo-substituents on the silicon heteroatom in the 2-position are essential since both the oxasilacycloalkanes and the oxadisila-α,ω-diols prepared therefrom are markedly less stable in the absence of both these substituents. These hydrocarbon substituents are monovalent, preferably of no more than seven carbons apiece and free of aliphatic i.e. non-benzenoid, unsaturation. The carbon atoms of the heterocycle generally carry hydrogen but can carry similar monovalent hydrocarbon radicals, again, generally of no more than seven carbons apice, with generally no more than two such substituents on the heterocycle.

The new oxasilacycloalkanes of the present invention have two hydrocarbon substituents on the silicon heteroatom and are represented by the structural formula

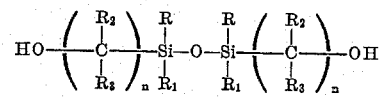

wherein R and $R_1$, which can be alike or different, are monovalent hydrocarbon radicals, preferably free of aliphatic i.e. non-benzenoid, unsaturation and of no more than seven carbons each, and $R_2$ and $R_3$, which also can be alike or different, are hydrogen or monovalent hydrocarbon radicals, also preferably free of aliphatic unsaturation and generally of no more than seven carbons each, and $n$ is an integer of from three to five, inclusive. The preferred monovalent hydrocarbon radicals include alkyl, aryl, aralkyl, alkaryl and cycloalkyl radicals.

The new 2,2-dihydrocarbo-1-oxa-2-silacycloalkanes of the present invention are readily converted in high yields and good purity by simple hydrolysis to long chain oxadisila-α,ω-diols which are useful as intermediates in the formation of intrachain silicon-containing condensation polymers, e.g., polyesters, polyurethanes, and the like. These glycols are α,ω-diols wherein the terminal hydroxyls are linked through saturated carbon chains of three to five carbons to two silicon atoms, which in turn are linked together directly through a single oxygen atom.

The carbon chain joining the terminal hydroxyl groups to the intrachain silicon atoms generally is unsubstituted but can carry monovalent hydrocarbon radicals generally of no more than seven carbons each and free of aliphatic unsaturation with generally no more than two such substituents on each carbon chain. These oxadisiladiols are formed from two molecules of the dihydrocarbooxasilacycloalkanes of this invention. These hydrocarbooxadisiladiols are also described by the following structural formula $$HO-\left(\begin{array}{c}R_2\\|\\-C-\\|\\R_3\end{array}\right)_n\overset{R}{\underset{R_1}{\overset{|}{Si}}}-O-\overset{R}{\underset{R_1}{\overset{|}{Si}}}-\left(\begin{array}{c}R_2\\|\\-C-\\|\\R_3\end{array}\right)_n-OH$$

wherein R, $R_1$, $R_2$, $R_3$, and $n$ are as before. The moiety

in this and other products herein is a divalent hydrocarbon radical, —R'—, preferably free from non-benzenoid unsaturation and having a chain of three to five acyclic carbons between its free valences.

The following examples in which parts are by weight are illustrative of the invention.

EXAMPLE I

*Part A. Preparation of 3-chloropropoxydimethylchlorosilane*

To a solution of 252 parts of dimethyldichlorosilane and 94 parts of trimethylenechlorohydrin (0.5 molar proportion, based on the silane), in about 180 parts of anhydrous diethyl ether was added, with sirring and under anhydrous conditions in a slow stream, 101 parts (an equimolar proportion, based on the chlorohydrin), of triethylamine while cooling the reaction mixture in an ice/water bath. After the addition of the amine was completed, the reaction mixture was stirred for an additional five minutes and the precipitate of triethylamine hydrochloride removed by filtration. The diethyl ether solvent was removed from the filtrate by distillation, and fractionation of the residue yielded 99.7 parts (53.3% of theory) of 3-chloropropoxydimethylchlorosilane as a clear, colorless liquid boiling at 72° C. under a pressure corresponding to 16 mm. of Hg.

*Analysis.*—Calculated for $C_5H_{12}Cl_2OSi$: C, 32.1%; H, 6.4%; Cl, 38.0%. Found: C, 32.3%; H, 6.6%; Cl, 37.8%.

*Part B. Preparation of 2,2-dimethyl-1-oxa-2-silicyclopentane*

A solution of 80 parts of 3-chloropropoxydimethylchlorosilane in about 37 parts of n-decane was slowly added to a rapidly stirred refluxing mixture of 19 parts (1.4+ molar proportions, based on the silane), of metallic sodium in about 370 parts of n-decane over a period of about one hour. After the addition was complete, refluxing was discontinued and the reaction mixture was stirred for 30 minutes. The reaction mixture was then distilled through a short indented column until the vapor temperature reached 171° C. The distillate was refractionated through a precision column. There was thus obtained 16.1 parts (30.8% of theory) of 2,2-dimethyl-1-oxa-2-silicyclopentane

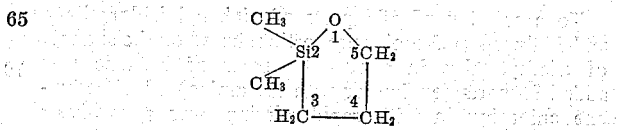

as a clear, colorless liquid boiling over the range 97–100° C. at atmospheric pressure.

*Analysis.*—Calculated for $C_5H_{12}OSi$: C, 51.7%; H, 10.3%; Si, 24.1%; M.W., 116. Found: C, 51.8%, 51.8%; H, 10.4%, 10.2%; Si, 24.2%,24.2%; M.W., 756.

Within an hour after the distillation the distilled fractions had increased appreciably in viscosity as a result of spontaneous ring-opening polymerization to give a polymer of the structure

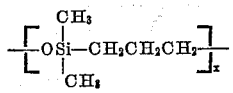

i.e., empirically $(C_5H_{12}OSi)_x$, $x$ being about 6.

This spontaneous ring-opening polymerization explains the above-reported high molecular weight. To obtain a purer sample of the monomer uncontaminated by polymer, a small sample of the viscous liquid product obtained by letting the above distillate stand was distilled through a precision microcolumn. The distillate obtained was a very fluid, clear liquid boiling at 95° C. at atmospheric pressure and exhibiting a $n_D^{26}$ of 1.4170.

*Analysis.*—Calculated for $C_5H_{12}OSi$: C, 51.7%; H, 10.3%; M.W., 116. Found: C, 51.5%; H, 10.3%; M.W., 122, 127.

Part C. Preparation of 4,4,6,6-tetramethyl-5-oxa-4,6-disila-1,9-nonanediol

Into a solution of 9 parts of water and about 0.6 part of concentrated hydrochloric acid in about 200 parts of acetone was distilled 50 parts of 2,2-dimethyl-1-oxa-2-silacyclopentane and the resulting reaction mixture allowed to stand at room temperature for four days. The acetone solvent was removed from the reaction mixture by distillation and the residue fractionated through a precision column. There was thus obtained 40.6 parts (75% of theory) of 4,4,6,6-tetramethyl-5-oxa-4,6-disila-1,9-nonanediol as a clear, colorless liquid boiling at 75° C. under a pressure corresponding to 20 mm. of Hg.

*Analysis.*—Calculated for $C_{10}H_{26}O_3Si_2$: C, 48.0%; H, 10.4%. Found: C, 48.4%, 48.7%; H, 10.5%, 10.6%.

Part D. Preparation of poly-4,4,6,6-tetramethyl-5-oxa-4,6-disila-1,9-nonane-o-methyl-p-phenylenedicarbamate About 0.15 part of triethylamine was added to a mixture of 2.2 parts of 4,4,6,6-tetramethyl-5-oxa-4,6-disila-1,9-nonanediol and 1.65 parts of toluene diisocyanate (o-methyl-p-phenylenediisocyanate). An exothermic reaction occurred and the reaction mixture was heated at steam-bath temperature for 1.5 hours. The resulting hard, clear yellow solid was extracted with chloroform and the chloroform solution freed of undissolved material by filtration. Upon addition of petroleum ether to the filtrate the poly-4,4,6,6-tetramethyl-5-oxa-4,6-disila-1,9-nonane-o-methyl-p-phenylenedicarbamate was obtained as a white, powdery solid. Clear, self-supporting films of the disila-polydicarbamate (i.e., a disila-polyurethane) were obtained by solvent casting from chloroform solution.

*Analysis.*—Calculated for $(C_{19}H_{32}O_5N_2Si_2)_x$: C, 53.7% H, 7.5%; Si, 13.2%. Found: C, 54.6%, 54.6%; H, 7.6%, 7.6%; Si, 13.1%, 13.5%.

A similar experiment using 2.0 parts of the diol and 1.4 parts of the diisocyanate resulted in the formation of the film-forming disila-polycarbamate exhibiting the following analysis: C, 53.8%; H, 7.6%.

EXAMPLE II

Part A. Preparation of 3-chloropropoxydiphenylchlorosilane

To a solution of 506 parts of diphenyldichlorosilane and 101 parts (0.5 molar proportion, based on the silane), of triethylamine in about 206 parts of benzene was added 94 parts (equimolar with the amine) of trimethylene chlorohydrin with rapid stirring over a two-hour period. At the end of the addition about 280 parts of diethyl ether was added and the precipitate of triethylamine hydrochloride then removed by filtration. After washing the precipitate with additional ether, the ether and benzene solvents were removed from the filtrate and washings by distillation. Upon further distillation of the residue, there was obtained 107 parts (34% of theory) of 3-chloropropoxydiphenylchlorosilane as a clear, colorless liquid boiling at 126–130° C. under a pressure corresponding to 0.13 mm. of Hg.

*Analysis.*—Calculated for $C_{15}H_{16}Cl_2OSi$: Cl, 22.8%. Found: Cl, 23.4%.

Part B. Preparation of 2,2-diphenyl-1-oxa-2-silacyclopentane

To a mixture of 15.7 parts of metallic sodium in about 690 parts of toluene maintained at the reflux was added with rapid stirring a solution of 106 parts (0.5 molar proportion, based on the sodium), of 3-chloropropoxy-diphenylchlorosilane in about 40 parts of toluene over a period of 2.5 hours. After the addition was complete, the reaction mixture was maintained at the reflux with continued rapid stirring for an additional 30 minutes. The reaction mixture was filtered and the resulting purple colloidal filtrate was centrifuged and refiltered to remove the last traces of the sodium chloride precipitate. The toluene was removed from the clear filtrate by distillation and after fractionation of the residue there was thus obtained 38.7 parts (35% of theory) of 2,2-diphenyl-1-oxa-2-silacyclopentane as a clear, colorless liquid boiling at 122° C. under a pressure corresponding to 0.23 mm. of Hg. On cooling, the product solidified and after recrystallization from decane and further crystallization from acetone was obtained as white crystals melting at 161.5–162.0° C.

*Analysis.*—Calculated for $C_{15}H_{16}OSi$: C, 75.0%; H, 6.7%; Si, 11.1%; M.W., 243. Found: C, 74.4%, 74.3%; H, 6.7%, 6.7%; Si, 11.2%; M.W., 250.

Part C. Preparation of 4,4,6,6-tetraphenyl-5-oxa-4,6-disila-1,9-nonanediol

Water was added to a solution of five parts of 2,2-diphenyl-1-oxa-2-silacyclopentane in about 50 parts of dioxane until the cloud point was reached. About 0.3 part of concentrated hydrochloric acid was then added and the solution clarified by the addition of dioxane. The reaction mixture was heated at steam-bath temperature for 1.5 hours and then allowed to stand at room temperature for two days. The dioxane solvent was removed by distillation at room temperature under a pressure corresponding to 20 mm. of Hg. The resulting light, straw-colored viscous liquid residue was heated at 65° C. under a pressure corresponding to 0.3 mm. of Hg for 10 minutes and then triturated in petroleum ether. The resultant solid was removed by filtration and recrystallized from cyclohexane. There was thus obtained 2.2 parts of 4,4,6,6-tretraphenyl-5-oxa-4,6-disila-1,9 - nonanediol as white crystals melting at 104–108° C. After a second recrystallization from cyclohexane the purified crystalline product melted at 110–111°.C. and exhibited an infrared spectrum in accord with the oxadisiladiol structure.

*Analysis.*—Calculated for $C_{30}H_{34}O_3Si_2$: C, 72.3%; H, 6.8%; M.W., 498. Found: C, 72.0%, 72.3%; H, 7.0%, 6.8%; M.W., 485, 535.

EXAMPLE III

Part A. Preparation of 4-chlorobutoxydimethyl-chlorosilane

A mixture of 36 parts of tetrahydrofuran and 129 parts (2.9 molar proportions, based on the furan), of dimethyldichlorosilane was heated in a sealed reactor under autogenous pressure for four hours at 200° C. The reactor was cooled, vented to the atmosphere, and the reaction mixture removed and fractionally distilled through a precision distillation column. There was thus obtained 90.7 parts (90% of theory) of 4-chlorobutoxydimethylchlorosilane as a clear, colorless liquid boiling at 64° C. under a pressure corresponding to 4.2 mm. of Hg.

*Analysis.*—Calculated for $C_6H_{14}OCl_2Si$: C, 35.8%; H, 7.0%; Si, 13.9%. Found: C, 37.0%, 36.8%; H, 7.4%, 7.4%; Si, 14.4%, 14.2%.

Part B Preparation of 2,2-dimethyl-1-oxa-2-silacyclohexane

To a rapidly stirred mixture of 27.6 parts of metallic sodium in about 300 parts of refluxing n-decane was added slowly 118 parts (0.49 molar proportion, based on sodium), of 4-chlorobutoxydimethylchlorosilane. At the end of the addition the reaction mixture was distilled through a take-off distillation column until the temperature at the head of the column reached 171° C. at atmospheric pressure. The distillate was redistilled through a precision fractionating column. There was thus obtained 51 parts (67% of theory) of 2,2-dimethyl-1-oxa-2-silacyclohexane as a clear, colorless liquid boiling at 122–125° C. at atmospheric pressure and exhibiting a refractive index $n_D^{25}$ of 1.4260.

*Analysis.*—Calculated for $C_6H_{14}OSi$: C, 55.4%; H, 10.8%; Si, 21.5%; M.W., 130. Found: C, 55.6%, 55.7%; H, 10.8%; 11.0%; Si, 21.3%, 21.2%; M.W., 133, 131.

Part C. Preparation of 5,5,7,7-tetramethyl-6-oxa-5,7-disila-1,11-undecanediol 2,2-dimethyl-1-oxa-2-siliacyclohexane (30.5 parts) and 4.4 parts (1.1 molar proportions) of water were mixed and stirred at room temperature. An exothermic reaction occurred causing a temperature rise to 50° C. To insure the completion of the reaction, about eight parts of acetone, 0.18 part of concentrated hydrochloric acid, and one part of water were added and the reaction mixture allowed to stand at room temperature over the weekend. The acetone was removed from the clear, colorless solution by distillation under a pressure corresponding to 15 mm. of Hg, and the excess water removed from the residue by distillation at 40° C. under a pressure corresponding to 0.13 mm. of Hg. Under these conditions a portion of the product also distilled and condensed into a solid carbon dioxide/acetone cooled trap ahead of the pump. This volatile portion of the product exhibited substantially the same refractive index and analyses as the non-volatile residue remaining. Furthermore, both fractions of the product exhibited identical infrared spectra, both of which were in agreement with the desired oxa-disiladiol. The total yield of 5,5,7,7-tetramethyl-6-oxa-5,7-disila-1,11-undecanediol was 26.7 parts (82% of theory).

*Analysis.*—Calculated for $C_{12}H_{30}O_3Si_2$: C, 51.8%; H, 10.8%; Si, 20.1%. Found (volatile): C, 51.2%, 50.9%; H, 10.9%, 10.8%; Si, 20.1%, 20.1%. Found (residue): C, 51.6%, 52.1%; H, 10.9%, 10.9%.

EXAMPLE IV

Part A. Preparation of 5-chloropentoxydimethylchlorosilane

A mixture of 42 parts of tetrahydropyran and 129 parts (2.05 molar proportions, based on the pyran), of dimethyldichlorosilane was heated in a sealed reactor for four hours at 200° C. under autogenous pressure. The reactor was cooled, vented to the atmosphere, and the liquid reaction mixture removed and purified by distillation through a precision fractionating column. There was thus obtained 53.5 parts (51% of theory) of 5-chloropentoxydimethylchlorosilane as a clear, colorless liquid boiling at 57° C. under a pressure corresponding to 0.6 mm. of Hg.

*Analysis.*—Calculated for $C_7H_{16}Cl_2OSi$: C, 39.1%; H, 7.4%; Cl, 33.0%. Found: C, 39.4%, 39.0%; H, 7.6%, 7.6%; Cl, 32.9, 32.8%.

Part B. Preparation of 2,2-dimethyl-1-oxa-2-silacycloheptane

To a rapidly stirred mixture of 3.25 parts of metallic lithium in about 220 parts of refluxing n-decane was added 50.3 parts (0.5 molar proportion, based on the sodium), of 5-chloropentoxydimethylchlorosilane. The reaction mixture was maintained at the reflux with stirring overnight (17 hours) at the end of which time the metallic lithium had completely disappeared. The reaction mixture was filtered and the filtrate purified by distillation through a precision fractionating column. There was thus obtained 7.1 parts (21% of theory) of 2,2-dimethyl-1-oxa-2-silacycloheptane as a clear, colorless liquid boiling at 143–146° C. at atmospheric pressure.

*Analysis.*—Calculated for $C_7H_{16}OSi$: C, 58.3%; H, 11.1%; Si, 19.4%; M.W. 144. Found: C, 56.8%, 56.5%; H, 10.8%, 10.8%; Si, 19.2%; M.W., 537, 524.

The above molecular weight figures show a degree of ring-opening polymerization of about four for the purified liquid sample on standing before analysis, to

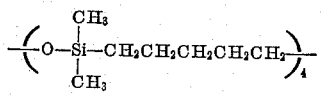

A sample of the initially purified liquid product was redistilled and analyzed promptly. The molecular weight of the redistilled fraction was indicated to be 248, showing that the ring-opening polymerization is rather rapid. Comparison of the boiling point of the liquid product with those of the previous smaller ring compounds, see Examples I and II, Parts B, shows that the oxasilacycloheptane distills as the seven-membered ring compound and not as the dimer.

The present invention is generic to 2,2-dihydrocarbo-1-oxa-2-silacycloalkanes containing only carbon, hydrogen, the one heterohyclic oxygen and the one heterocyclic silicon, i.e. to 2,2-dihydrocarbo-1-oxa-2-silacycloalkanes and their hydrocarbo-substituted 2,2-dihydrocarbo-1-oxa-2-silacycloalkanes wherein the oxasila heterocycle has from five to seven ring members and wherein the two necessary hydrocarbon substituents on the silicon atom of the heterocycle and any hydrocarbon substituents on the carbons of the heterocycle, if any, including alkyl, aryl, aralkyl, alkaryl and cycloalkyl, generally have no more than seven carbons apiece. These new oxasilacycloalkanes are generally preparable by reacting, with two equivalents of an alkali metal or alkaline earth metal, an ω-halogenoalkoxydihydrocarbohalogenosilane wherein the carbon chain of the ω-halogenoalkoxy radical is that of the carbon chain in the oxasilacycloalkane ring. Schematically, this generic preparative route is indicated by the following formula

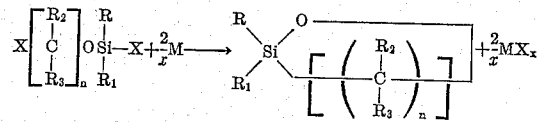

wherein the X's are halogen, alike or different, and preferably of atomic number of at least 17, and most preferably of atomic number no greater than 35, i.e., most preferably chlorine and bromine, R, $R_1$, $R_2$, $R_3$, and $n$ are are as before, and M is an alkali metal or alkaline earth metal of normal combining valence $x$, e.g., potassium or magnesium.

The ring-forming reaction is normally carried out at elevated temperatures in an inert organic diluent and most conveniently and simply at the reflux temperature of the inert liquid being used. Suitable examples of these inert liquid diluents include the normally liquid aliphatic hydrocarbons such as the pentanes, hexanes, heptanes, octanes, decanes, and the like; the normally liquid aromatic hydrocarbons such as benzene, toluene, the xylenes, and the like; the hydrocarbon ethers, e.g., diethyl and di-n-butyl ether, and the like, etc. For the alkali metals, especially sodium, the reaction solvent should have a normal boiling point above the melting point of the metal.

The ring-forming reaction is effected between the necessary stoichiometric proportions of an alkali or alkaline earth metal and the foregoing halogenoalkoxydihydrocarbohalogenosilanes. Suitable such metals, in addition to those given in the examples, are sodium-potassium alloy, potassium, rubidium, magnesium, and the like. For reasons of cost, readier availability, and generally good overall reaction efficiency, the alkali metals are preferred, particularly lithium, sodium, potassium, sodium-potassium alloy, and especially sodium. The condensing metal is used in stoichiometric amount or in slight excess thereof. The stoichiometric amount of course depends on the normal combining valence of the metal. Thus, for the alkali metals, at least two molar proportions based on the halogenolakoxydihydrocarbohalogenosilane are used; whereas, for the alkaline earth metals only one molar proportion is necessary.

The two hydrocarbon substituents directly linked to the silicon atom in the halogenoalkoxydihydrocarbohalogenosilane remain attached thereto and become the 2,2-dihydrocarbon substituents in the oxasilacycloalkane. Furthermore, the carbons of the halogenoalkoxy chain constitute the ring carbon members of the dihydrocarbooxasilacycloalkane. Thus the chain of carbons between the halogen and the oxygen in the halogenoalkoxy radical contains from three to five carbons. Suitable ω-halogenoalkoxydihydrocarbohalogenosilanes, in addition to those illustrated specifically in the foregoing examples, include 3-chlorobutoxydibenzylbromosilane, 3-bromobutoxydi-n-heptylbromosilane, 3-chlorobutoxydi-n-propylchlorosilane, 3-chloroisobutoxydicyclohexylchlorosilane, 1-chloro-3-methyl-3-pentoxydiethylchlorosilane, 4-chlorobutoxyethylmethylchlorosilane, and the like.

These ω-halogenoalkoxydihydrocarbohalogenosilanes can be prepared by direct condensation between a dihydrocarbodihalosilane and the requisite alkylene halohydrin, i.e., an ω-haloalkanol, in the presence of molar proportions of a dehydrohalogenating agent, conventionally a strong organic amine and preferably a tertiary amine. While this method of synthesis of these intermediates works well and is of generic applicability, a more convenient method is that of the direct thermal condensation between a dihydrocarbodihalogenosilane and a cyclic alkyl ether, i.e., an oxacycloalkane, of the same number of ring carbons as desired in the carbon chain of the halogenoalkoxy group, i.e., the same number of carbons desired in the ring of the final oxasilacycloalkane.

Thus, where an oxasilacyclohexane is desired, the number of the ring carbons in the heterocyclic is four and the number of chain carbons in the ω-halogenoalkoxy group of the intermediate ω-halogenoalkoxydihydrocarbohalogenosilane is also four, and accordingly, in this mode of preparation, the halogenosilane intermediate is obtained by direct thermal condensation between a dihydrocarbodihalogenosilane and a five-ring membered cyclic ether having four ring carbons, e.g., tetrahydrofuran. In this direct condensation, the reactants are simply heated together, conventionally in a sealed reactor under autogenous pressure, at elevated temperatures generally in the range 150–250° C.

Additional dihydrocarbooxasilacycloalkanes of this invention are 2,2-dibenzyl-3-methyl-1-oxa-2-silacyclopentane, 2,2-diheptyl-3-methyl-1-oxa-2-silacyclohexane, 2,2-dipropyl-3-methyl-1-oxa-2-silacyclopentane, 2,2-dicyclohexyl-4-methyl-1-oxa-2-silacyclopentane, 2,2-diethyl-5-ethyl-5-methyl-1-oxa-2-silacyclopentane, 2-ethyl-2-methyl-1-oxa-2-silacyclohexane, and the like.

The new oxasilacycloalkanes of the present invention have a wide variety of uses. The oxasilacycloalkanes spontaneously addition polymerise to form linear siloxane polymers of the structure

wherein R and $R_1$ are monovalent hydrocarbon radicals, R' is a divalent hydrocarbon radical free from non-benzenoid unsaturation and having an acyclic chain of three to five carbons between its free valences, and $x$ is of the order of 5 to 50. Such polymers, in particular of the 2,2-dimethyl-1-oxa-2-silacyclopentane of Example I wherein R and $R_1$ are methyl, R' is the trimethylene radical, are readily obtained having a degree of polymerization of about 20, corresponding in molecular weight to about 2300. These materials are clear, water-white, viscous liquids and are useful as stable fluids useful as pressure transmissive fluids at low temperatures, generally below about 50° C. and especially in the low temperature ranges. On heating, the various addition polymers readily crack to form the cyclic monomer and thus also afford a convenient source of pure monomer.

The oxasilacycloalkanes are readily hydrolyzed to relatively long chain (the shortest having nine chain members) oxadisiladiols. These oxadisiladiols are in themselves useful as bifunctional condensation polymer-forming ingredients for reaction with other bifunctional ingredients capable of interaction with hydroxy groups. This latter condensation polymer-forming utility is also expressly illustrated in the examples by formation of high molecular weight, film-forming disilapolydicarbamates through reaction with certain diisocyanates. Polymer-forming reactions with other reactive bifunctional polymer-forming ingredients such as the diacyl halides, the dicarboxylic and disulfonic acids, and the like, form the corresponding disilapolyesters. These polyesters, particularly the carbamates, give clear, colorless, flexible, relatively tough water-resistant films when cast from solution, e.g., in chloroform.

These oxadisiladiols are also useful in the formation of longer chain polyoxadisiladiols by equilibration with an octahydrocarbocyclotetrasiloxane, generally in the presence of acid. These longer chain polyoxadisiladiols are represented by the formula

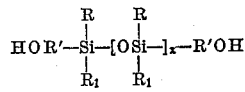

where R, $R_1$, and R' are as in the structural formula next above. More specifically, the equilibration of the oxadisiladiol of Example I, Part C, with octamethylcyclotetrasiloxane in the presence of sulfuric acid produced a rather viscous liquid of indicated molecular weight about 4000, having the above structure wherein R and $R_1$ are both methyl and R' is the trimethylene radical, and $x$ is about 50. By varying the molar proportions of the diol and the cyclotetrasiloxane products of varying molecular weight are obtained where $x$ varies from a small integer, e.g., 3, 4, 5, etc., to large whole numbers ranging upward to 100 to 200 and the like.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A 2,2-dihydrocarbo-1-oxa-2-silacyloalkane containing only carbon atoms, hydrogen atoms, one oxygen atom, and one silicon atom and having from five to seven members in the ring, one being oxygen and one silicon.

2. A compound according to claim 1 wherein the hydrocarbon radicals in the two position are of up to seven carbon atoms each.

3. A compound according to claim 1 wherein the hydrocarbon radicals in the two position are of up to seven carbon atoms each and are free of nonbenzenoid unsaturation.

4. A 2,2 - dialkyl - 1-oxa-2-silacycloalkane containing only carbon atoms, hydrogen atoms, one oxygen atom, and one silicon atom and having from five to seven members in the ring, one being oxygen and one silicon.

5. A 2,2-dimethyl-1-oxa-2-silacycloalkane containing only carbon atoms, hydrogen atoms, one oxygen atom, and one silicon atom and having from five to seven members in the ring, one being oxygen and one silicon.

6. A 2,2-diaryl-1-oxa-2-silacycloalkane containing only carbon atoms, hydrogen atoms, one oxygen atom, and one silicon atom and having from five to seven members in the ring, one being oxygen and one silicon.

7. A 2,2-diphenyl-1-oxa-2-silacycloalkane containing only carbon atoms, hydrogen atoms, one oxygen atom, and one silicon atom and having from five to seven members in the ring, one being oxygen and one silicon.

8. A polymer of a compound according to claim 1 essentially consisting of recurring units of the formula

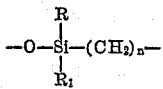

wherein R and $R_1$ are monovalent hydrocarbon radicals and $n$ is an integer from three to five.

9. A polymer of a compound according to claim 1 essentially consisting of recurring units of the formula

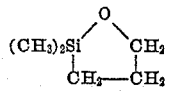

wherein R and $R_1$ are monovalent hydrocarbon radicals, R' is a divalent hydrocarbon radical free from non-benzenoid unsaturation and having an acyclic chain of three to five carbons between its free valences.

10. The compound of the formula

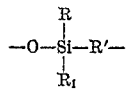

11. An organosilicon compound of the unit formula

[—Si(CH$_3$)$_2$CH$_2$CH$_2$CH$_2$O—]

No references cited.